Nov. 9, 1954 L. A. MEACHAM 2,694,115

PUSH-PULL TRANSISTOR AMPLIFIER WITH CONJUGATE INPUT AND OUTPUT IMPEDANCES

Original Filed June 28, 1950

INVENTOR
L. A. MEACHAM
BY Harry C. Hart
ATTORNEY 2,694,115
Patented Nov. 9, 1954

1

2,694,115

PUSH-PULL TRANSISTOR AMPLIFIER WITH CONJUGATE INPUT AND OUTPUT IMPEDANCES

Larned A. Meacham, New Providence, N. J., assignor to Bell Telephone Laboratories, Incorporated, New York, N. Y., a corporation of New York Original application June 28, 1950, Serial No. 170,727, now Patent No. 2,663,766, dated December 22, 1953. Divided and this application February 17, 1954, Serial No. 410,895

5 Claims. (Cl. 179—171)

This application is a division of application Serial No. 358,068, filed May 28, 1953, which in turn was a division of application Serial No. 170,727, filed June 28, 1950, which issued on December 22, 1953, as U. S. Patent 2,663,766.

This invention relates to transistor amplifiers and particularly to improved transistor amplifier circuits.

A principal object of the invention is to obtain strictly one-way amplification of signals by means of a transistor amplifier.

Related object are to render the input impedance of a transistor amplifier circuit independent of its load, and to render its output impedance independent of the impedance of the signal source which drives it.

The three basic transistor amplifier circuits, namely grounded base, grounded emitter, and grounded collector, are described, and their properties summarized in "Some Circuit Aspects of the Transistor" by R. M. Ryder and R. J. Kircher published in the Bell System Technical Journal for July 1949 at page 367 (vol. 28). As examination of the mathematical expressions for input and output impedance as published by Ryder and Kircher shows, the input impedance depends in each case on the load and the output impedance depends on the source impedance. As a result, in the design and construction of a multistage amplifier, it is impossible to treat each of the several stages as if it were alone. On the contrary, the properties of each stage depend on the characteristics of the other stages of the group. This places restrictions on the designer and limits the ease with which a transistor amplifier may be treated as a circuit element for general purposes. Ryder and Kircher also show that, in general, the backward gain of a transistor amplifier is not zero.

Now it happens that certain features of the transistor behave differently in the different amplifier circuits. As a principal example, consider the effects on the input impedance, in the case of each of the three basic circuits, of an increase in the current-multiplication factor alpha which, as explained by Ryder and Kircher on page 375 of the aforementioned publication, is approximately equal to the ratio of the mutual resistance $r_m$ of the transistor to its collector resistance $r_c$. In the grounded base circuit, the input impedance may be reduced and may even be made to pass through zero and become negative by increasing the positive feedback, as by increasing the current-multiplication factor. On the other hand, a similar increase of feedback in the grounded emitter circuit tends to increase the magnitude of the input impedance, and may even cause it to reach and pass an infinite value, thereafter becoming negative. Similar opposing tendencies are found with respect to the output impedance as between the grounded base circuit and the grounded collector circuit.

The present invention turns these opposing tendencies to positive account by balancing one against the other. In one embodiment, a circuit configuration is provided which is a mean between the grounded emitter circuit and the grounded base circuit and in which the tendencies of the one are balanced against the corresponding opposing tendencies of the other. It turns out, when the balance is correct, that the output circuit is conjugate to the input circuit with the results that the input impedance is independent of the load impedance while the output impedance is independent of the impedance of the driving source. In addition, the input impedance is also independent of the current-multiplication factor alpha, and the backward transmission of the amplifier network is zero.

2

In a second embodiment, a circuit configuration is provided which is a mean between the grounded base circuit and the grounded collector circuit. Here again the output circuit is conjugate to the input circuit in such a way that the output impedance is independent of the impedance of the driving source and the backward transmission of the network as a whole is zero.

Each of the foregoing embodiments involves the neutralization of the effects of feedback which are inherent in one of the parent circuits by equal and opposite effects of feedback inherent in the other. Extension of this principle to an amplifier network comprising a pair of transistors connected in push-pull leads to a cross-neutralization of the positive feedback voltage of each member of the pair by an oppositely phased voltage derived from the other member of the pair.

The circuits of the invention are evidently useful wherever strictly unilateral transmission is desired, and also wherever it is important that the impedance presented by an amplifier network at one pair of terminals be independent of the impedance connected to the opposite pair of terminals; for example, in the design of a cascade amplifier network or in the association of an amplifier with a network which is sensitive to changes in magnitude of the impedances connected thereto.

The invention will be fully apprehended from the following detailed description of preferred embodiments thereof taken in connection with the appended drawings, in which.

Figure 1:
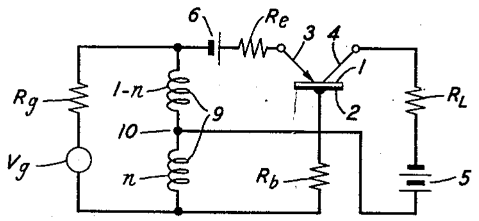
Fig. 1 is a schematic circuit diagram showing one embodiment of the invention.
Figure 3:
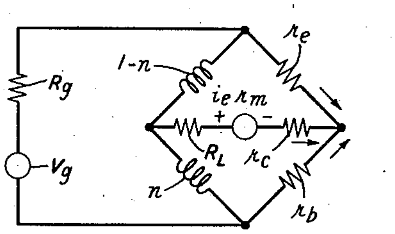
Figure 2:
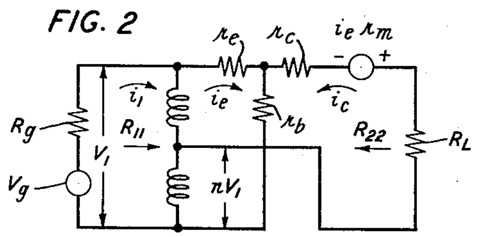
Fig. 2 is an equivalent circuit diagram of Fig. 1.
Figure 5:
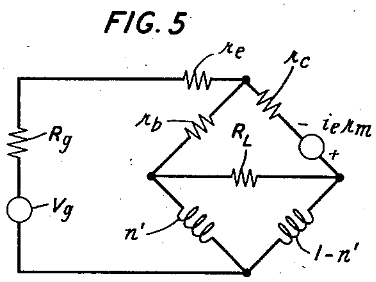
Figure 4:
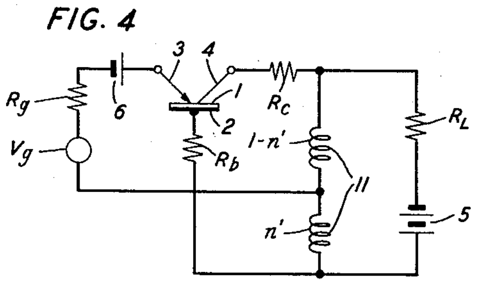
Figure 7:
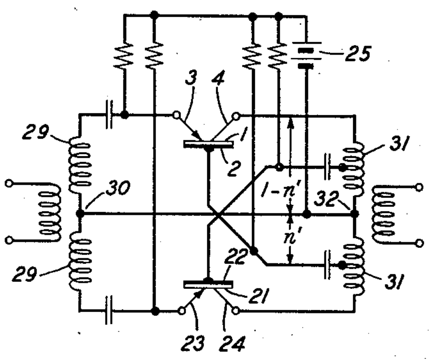
Figure 6:
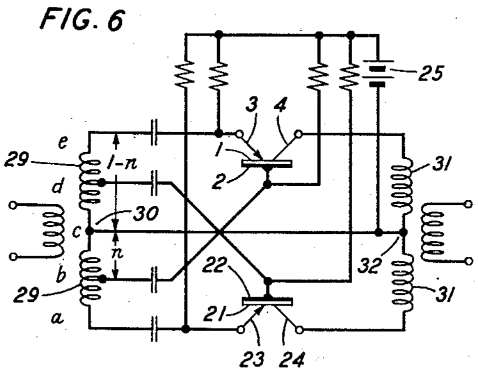

In Fig. 3, Fig. 2 is redrawn as a bridge circuit;

Fig. 4 is a schematic circuit diagram of second embodiment of the invention;

In Fig. 5, Fig. 4 is redrawn as a bridge circuit;

Fig. 6 is a schematic circuit diagram showing the application of the principles of Fig. 1 to an amplifier network comprising a pair of transistors connected in push-pull; and Fig. 7 is a schematic circuit diagram showing the application of the principles of Fig. 4 to an amplifier network comprising a pair of transistors connected in push-pull.

Referring now to the drawings, Fig. 1 shows a transistor comprising a semiconductive body 1 having a base electrode 2, an emitter electrode 3 and a collector electrode 4 making contact therewith, a signal source represented by the idealized generator $V_G$ and its internal resistance $R_g$ connected to the emitter 3 and to the base 2, respectively, and a load $R_L$ in circuit with the collector 4. Operating bias potentials are supplied for the collector by a first battery 5 and for the emitter by a second battery 6. Padding resistors $R_e$ and $R_b$ may be inserted in series with the emitter and base electrodes, respectively, if desired.

In accordance with the invention, there is provided between the emitter electrode 3 and the base electrode 2 a voltage divider network which is preferably, though by no means necessarily, reactive. Thus, a tapped coil 9 is shown, while a pair of condensers connected in series would serve equally well at low frequencies. The coil 9 will of course fail to support a voltage at the very low frequencies and the condensers will fail to support it at the very high frequencies; wherefore if the performance and operation are contemplated over the whole gamut of frequencies, a tapped resistor may be preferred. Because of the power dissipated in the resistor, a reactive voltage divider such as the coil 9 which is as nearly as possible an ideal coil, of negligible loss and unity coupling between the two sides, is in general preferable.

In accordance with the invention, the collector 4 is returned not to the base electrode 2 as in the case of the grounded base circuit, nor to the emitter electrode 3 as in the case of the grounded emitter circuit, but to an intermediate point of the voltage divider impedance element, such as the tap 10 on the coil 9. On the hypothesis that the total number of turns of the tapped coil 9 is proportional to unity and that the tap is located at a point which is removed from the base electrode end of the coil by a fraction $n$ of the turns and from the emitter end of the coil by a fraction $(1-n)$ of the turns, and with the aid of the simplified equivalent circuit diagram, Fig. 3, the circuit equations may be formulated. In Fig. 2 the polarizing batteries are omitted and the transistor (including padding resistors $R_e$ and $R_b$ if they are used) is replaced by the equivalent group of resistances $r_e$, $r_b$ and $r_c$ and the mutual impedance element $r_m$, all of which quantities and terms have the significance given them in the Ryder-Kircher publication above referred to. The circuit equations so obtained are as follows:

$$\begin{aligned} &V_G-i_lR_G-V_l=0 \\ &V_l-i_e(r_e+r_b)-i_cr_b=0 \\ &(1-n)V_l-i_er_e+i_er_m-i_c(r_c+R_L)=0 \\ &i_l=i_e+ni_c \end{aligned} \quad (1)$$

When $i_l$ and $V_l$ are eliminated from the above, there result $$\begin{aligned} i_e[(1-n)R_G+r_e-r_m]+i_c[n(1-n)R_G-r_c-R_L] &=(1-n)V_G \\ i_e[R_G+r_e+r_b]+i_c[nR_G+r_b] &=V_G \end{aligned} \quad (2)$$

from which, in the customary manner, the circuit determinant $\Delta$ may be formed by cross-multiplication of the coefficients of the currents $i_e$ and $i_c$, its magnitude being given by $$\begin{aligned} \Delta_n=&R_G[n^2r_e+(1-n)^2r_b-nr_m+r_c+R_L] \\ &+r_b(r_c+R_L)+r_e(r_b+r_c+R_L)-r_mr_b \end{aligned} \quad (3)$$

Comparing this expression with the expressions given by Ryder and Kircher for the grounded base circuit on page 376 and for the grounded emitter circuit on page 378, it may be seen that the expression (3) is more complex than either one, and partakes of the nature of each; that when $n=0$ it reduces to the expression for the grounded base circuit, while for $n=1$ it reduces to the corresponding expression for the grounded emitter circuit; and that, in short, it represents a compromise between the two.

Following known methods of circuit analysis, and utilizing the definition of input impedance, namely $$R_{11}=\frac{V_G}{i_l}-R_G \quad (4)$$

it may be shown that $$R_{11}=\frac{r_b(r_c+R_L)+r_e(r_b+r_c+R_L)-r_mr_b}{n^2r_e+(1-n)^2r_b-nr_m+r_c+R_L} \quad (5)$$

while the output impedance $R_{22}$, correspondingly defined, is given by $$R_{22}=\frac{R_G[n^2r_e+(1-n)^2r_b-nr_m+r_c]}{R_G+r_e+r_b}+\frac{r_br_c+r_e(r_b+r_c)-r_mr_b}{R_G+r_e+r_b} \quad (6)$$

Now it turns out that if $n$ is given the value $$n=\frac{r_b}{r_b+r_e} \quad (7)$$

and this value is substituted in (3) and (5) above, these expressions are greatly simplified, reducing to $$\Delta=[R_G+r_e+r_b][R_L+r_c-n(r_m-r_e)] \quad (3a)$$
$$R_{11}=r_e+r_b \quad (5a)$$
$$R_{22}=r_c-n(r_m-r_e) \quad (6a)$$

wherefore $$\Delta=[R_G+R_{11}][R_L+R_{22}] \quad (3b)$$

Equation 5*a* shows that the input impedance is now independent of the load $R_L$, and of $r_m$, which is a measure of the current multiplication factor, alpha. Equation 6*a* shows that the output impedance is independent of the source impedance $R_G$.

Furthermore, defining the forward power gain as the ratio of the power delivered to the load to that supplied to the input when the source impedance and the input impedance are matched, $$G_F=\frac{i_c^2R_L}{V_G^2/4R_G} \quad (8)$$

and using conventional methods to substitute for $$\frac{i_c}{V_G}$$

there results $$G_F=4R_GR_L\left(\frac{r_m}{\Delta}\right)^2 \quad (9)$$

Similarly it can be shown that the backward power gain reduces to zero; i. e.

$$G_R=0 \quad (10)$$

With a typical transistor, signal source, and load, having the following parameter values:

$r_e=390$ ohms
$r_b=140$ ohms
$r_c=19{,}000$ ohms
$r_m=34{,}000$ ohms
$R_G=500$ ohms
$R_L=10{,}000$ ohms the proportioning of the voltage divider impedance element in accordance with Equation 7 gives $$n=\frac{r_b}{r_e+r_b}=0.264$$
$$R_{11}=r_e+r_b=530 \text{ ohms}$$
$$R_{22}=r_c-n(r_m-r_e)=10{,}100 \text{ ohms}$$
$$G_F=54$$
$$10 \log G_F=17.3 \text{ db}$$

It is of interest to consider the new circuit configuration and its behavior and properties from a different standpoint, and to this end the circuit of Fig. 2 has been redrawn in Fig. 3 without alteration of any of the connections. Fig. 3 clearly brings out the fact that the circuit is essentially a Wheatstone bridge; and that, when the bridge is balanced by proportioning the ratio arms in accordance with Equation 7, namely so that $$n=\frac{r_b}{r_b+r_e} \quad (7)$$

then the two diagonals of the bridge are conjugate to each other. In accordance with the well-known principles of conjugacy, a voltage applied to the vertical diagonal of the bridge, as by application of the signal of the external source $V_G$, causes no current to flow through the horizontal diagonal. The current of the source divides at the upper junction point, a first fraction flowing through the resistances $r_e$ and $r_b$ in series and another fraction flowing through the ratio arms $1-n$ and $n$ in series. By making the impedance of the voltage divider impedance element 9 large, it can be arranged that the second fraction of the generator current is so small as to be practically negligible, so that the impedance presented to the generator is substantially equal to $r_e+r_b$ in accordance with Equation 5*a*. This impedance is independent of the load impedance $R_L$, of the mutual resistance $r_m$, which measures the current-multiplication factor alpha, and also of the collector contact resistance $r_c$. In short, the impedance presented by the bridge to the generator $V_G$ is independent of all of the circuit elements which are contained in the conjugate diagonal of the bridge.

This does not mean that the load $R_L$ carries no current. On the contrary, the generator current flowing through the emitter resistance $r_e$ results in the generation of an effective internal electromotive force by the transistor which, as explained in the Ryder-Kircher publication above referred to, is proportional to the emitter current, the constant of proportionality being termed the mutual resistance and designated $r_m$. The fictitious internal generator $i_er_m$ is connected in the horizontal diagonal of the bridge and in series with the load resistance $R_L$. Therefore, when the external generator $V_G$ delivers a signal to the bridge, a current proportional to it flows through the load resistance $R_L$, and forward transmission is obtained. The power gain associated with this forward transmission is given by Equation 9.

It may also be seen by examining the bridge network of Fig. 3 that the backward transmission of the system is zero. Thus, suppose an external signal E to be generated across the terminals of the load $R_L$ by any cause whatsoever. This may upset the potential difference between the two ends of the horizontal diagonal and it may, indeed, cause current to flow through all of the arms of the bridge. However, inasmuch as the horizontal diagonal has been adjusted to a condition of conjugacy with the vertical diagonal, this disturbance causes no current to flow through the external resistor $R_g$. Thus the backward transmission of the system is zero.

This does not mean that the impedance looking into its output terminals is infinite. On the contrary, as stated above, the introduction of such an electromotive force in the load causes current to flow through the horizontal diagonal and through all of the bridge arms, and the effect of this behavior is to produce an output impedance $R_{22}$ whose magnitude is given by (6*a*) above. This may now be shown as follows.

Subject to the restriction that the voltage divider impedance element 9 is a perfect or ideal coil with unity coupling between the two sides, then this postulated electromotive force produces no voltage drop across either part of the coil, and the mesh equation for the upper mesh of the bridge becomes simply $$E+r_m i_e=0+r_e i_e+r_c(i_e+i_b) \qquad (11)$$

From Kirchoff's first law for the junction point of $r_e$, $r_b$ and $r_c$, $$i_e+i_b+i_c=0 \qquad (12)$$

while, when the bridge is balanced, $$i_e r_e=i_b r_b \qquad (13)$$

Eliminating $i_e$ and $i_b$ by substituting (12) and (13) into (11), and then dividing through by $i_c$ gives $$R_{22}=\frac{E}{i_c}=r_c-n(r_m-r_e) \qquad (6a)$$

which, it will be observed, is identical with the expression obtained above by reduction of the circuit determinant (3).

Fig. 4 shows the application of the foregoing principles to produce a mean between the grounded base circuit and the grounded collector circuit. Here a voltage divider impedance element which, as before, is preferably an ideal coil 11 with unity coupling between the two parts but may instead be a tapped resistor or a pair of condensers or separate inductances in series, is connected between the collector electrode 4 and the base electrode 2, while the emitter electrode 3, in series with which the external signal source symbolically represented by the voltage generator $V_G$ and its internal resistance $R_g$, is returned to some point on the coil 11 which is intermediate between its ends. As before, padding resistors $R_b$ and $R_c$ may be added in series with the base and the collector, respectively. Fig. 5 is the same circuit, redrawn to bring out the fact that the load $R_L$ and the signal source $V_G$ are in the horizontal diagonal and the vertical diagonal, respectively, of a Wheatstone bridge; and that when this bridge is balanced by proportioning the two parts of the coil 11 in the ratio of the base resistance to the collector resistance, the load and source are respectively conjugate to each other. Thus, if the two parts of the voltage divider impedance element 11 are proportional to $n'$ and to $1-n'$, respectively, establishment of the relation $$n'=\frac{r_b}{r_b+r_c} \qquad (14)$$

balances the bridge. However, because the internal equivalent generator $i_e r_m$ is now in one bridge arm instead of in the horizontal diagonal, it is no longer the case that the input impedance of the network is independent of the load or of the transistor current-multiplication factor. However, it is still true that the backward transmission is zero, and it now turns out that the output impedance of the network, namely the impedance looking from the load terminals toward the transistor, is independent of the impedance $R_g$ of the signal source.

To carry out the invention, it is of course not necessary that a perfect adjustment of the two parts of the voltage divider impedance elements be made exactly in the ratio of the contact resistances of the transistor. On the contrary, at the sacrifice of a small amount of power and gain, a resistor can be added in series with the base, the emitter, or the collector, as desired in order to increase or reduce the ratio given by Equation 7 or 14 and so facilitate the achievement of the balance of the invention without the fabrication of a special coil having an exactly located tap. In particular, an external emitter resistor $R_e$ and an external base resistor $R_b$ have been included in the circuit of Fig. 1 to make the base resistance as padded bear some desired relationship to the emitter resistance as padded; for example equality therewith, and so to adjust the ratio $$\frac{r_b+R_b}{r_b+R_b+r_e+R_e}$$

to exactly one half, in which case a secondary winding of a center-tapped transformer may conveniently be employed as the voltage divider impedance element.

However, economy is by no means the only consideration in the choice of $n$. For example, referring to Equation 6*a*, if $n$ is one-half, and if, as is generally the case, $r_m$ is equal to or greater than $2r_c$, while $r_e$ is negligible in comparison to $r_m$, the output impedance $R_{22}$ becomes zero or negative, and instability may result. It is to be understood that the principles of the invention are not to be applied without regard to stability considerations. It will also be recognized that choice of $n$ affords a convenient means of establishing a desired value of $R_{22}$ in accordance with Equation 6*a*, or of $R_{11}$ in accordance with Equation 5*a*. By resorting to padding resistors $R_e$, $R_b$ or $R_c$ or a combination of them, $n$ or $n'$ can be chosen within wide limits while still satisfying Equation 7 or 14 as the case may be.

Fig. 6 shows the application of the principles of the invention to an amplifier comprising a pair of transistors 1, 21, connected in push-pull. The signal is applied by way of an input transformer having a center-tapped secondary winding 29 to the emitters 3, 23, of the two transistors in opposite phase and is withdrawn from the two collectors 4, 24 likewise in push-pull, by way of an output transformer 31 whose primary winding is center-tapped at the point 32. The two center taps 30, 32 are connected together. Here, however, portions of the secondary winding of the input transformer 29 which serve as the voltage divider impedance element do double duty for the upper transistor 1 and for the lower one 21. Thus, for the upper transistor, the lower portion of the voltage divider impedance element, proportional to $n$ in Fig. 1, runs from the point *b* to the center tap 30 of the secondary winding 29 while the upper portion, proportional to $1-n$, runs from the center tap 30 to the point *e*. Similarly, for the lower transistor the first portion of the coil, proportional to $n$, runs from the point *d* to the center tap 30 while the second portion, proportional to $1-n$, runs from the center tap 30 to the point *a*.

Biasing voltages may be applied to the electrodes of the transistors of Fig. 6 by connection of the negative terminal of a battery 25 to the center tap 32 of the output transformer 31, the opposite terminal of the battery 25 being connected by way of individual isolating resistors and blocking condensers to the emitters and bases of the two transistors.

With this arrangement the points *d* and *b* move outward to the coil end terminals *e* and *a*, respectively, under the special conditions that the emitter resistance is equal to the base resistance, whether intrinsically or by the addition of padding resistors, so that the ratio $$\frac{r_b}{r_b+r_e}$$

is equal to one-half. Under this condition the whole of the secondary winding of the input transformer 29 does double duty for the upper transistor 1 and for the lower one 21. In the general case when the ratio in question is not equal to one-half, then the center tap 30 of the input winding 29 divides the portion *b*—*e* of this winding which interconnects the emitter 3 and the base 4 of the upper transistor 1 into two portions whose ratio is equal to the ratio of the base resistance to the emitter resistance; while similarly, the same center tap 30 divides the portion *a*—*d* of the input winding 29 which interconnects the base 22 with the emitter 23 of the lower transistor 21 in the ratio of its base resistance to its emitter resistance.

The same principles may be applied to a push-pull transistor amplifier network which embodies the features of Figs. 4 and 5, as shown by Fig. 7. Here the two ends of an input winding 29 are connected to the emitters 3, 23 of two transistors 1, 21, while the two ends of an output winding 31 are connected to the collectors 4, 24 of the same two transistors. Each winding is provided with a center tap, and the center taps 30, 32 are connected together. Further, each portion of the output winding 31 is provided with an upper intermediate tap, located between the center tap and upper end of the winding and with a lower intermediate tap located between the center tap and the lower end of the winding. The base 2 of the upper transistor 1 is returned to the lower intermediate tap while the base 22 of the lower transistor 21 is returned to the upper intermediate tap. Biasing voltages may be derived from a battery 25 and applied by way of isolating resistors and blocking condensers to the electrodes in the manner shown. Now, the center tap 32 of the output winding 31 divides that portion of the output winding which interconnects the base of the upper transistor with its collector in accordance with Equation 14; i. e., in the ratio of the transistor base resistance to its collector resistance, while, similarly, the same center tap 32 divides that portion of the output winding which interconnects the base of the lower transistor with its collector in the ratio of the base resistance of the lower transistor to its collector resistance. Thus, as in the case of Fig. 6, portions of the winding lying immediately above and below the center tap do double duty for the two transistors.

What is claimed is:

1. A push-pull translating network which comprises a pair of transistors each of which has a semiconductive body, an emitter electrode, a collector electrode and a base electrode making contact with said body, a load impedance element having two end terminals connected, respectively, to the collector electrodes of the two transistors and having a center tap, an input impedance element having two end terminals connected, respectively, to the emitter electrodes of the two transistors and having a center tap connected to the center tap of the load impedance element, the base electrode of each transistor being connected to a point of one of said impedance elements which is intermediate between the center tap of said impedance element and the end terminal of said impedance element which is connected to one of the electrodes of the other transistor.

2. Apparatus as defined in claim 1 wherein the base electrode of each transistor is connected to a point of the input impedance element which is intermediate between the center tap of said impedance element and the end terminal of said impedance element which is connected to the emitter electrode of the other transistor.

3. Apparatus as defined in claim 2 wherein said center tap divides the portion of said input impedance element which interconnects the base electrode of one of said transistors with the emitter electrode of the same transistor in the ratio of the base resistance of said transistor to the emitter resistance of said transistor.

4. Apparatus as defined in claim 1 wherein the base electrode of each transistor is connected to a point of the output impedance element which is intermediate between the center tap of said impedance element and the end terminal of said impedance element which is connected to the collector electrode of the other transistor.

5. Apparatus as defined in claim 4 wherein said center tap divides the portion of said output impedance element which interconnects the base electrode of one of said transistors with the collector electrode of the same transistor in the ratio of the base resistance of said transistor to the collector resistance of said transistor.

No references cited.